(12) United States Patent
Yang et al.

(10) Patent No.: US 9,515,321 B2
(45) Date of Patent: Dec. 6, 2016

(54) BINDER SOLUTION FOR ANODE, ACTIVE MATERIAL SLURRY FOR ANODE COMPRISING THE BINDER SOLUTION, ANODE USING THE SLURRY AND ELECTROCHEMICAL DEVICE COMPRISING THE ANODE

(71) Applicant: LG Chem, Ltd., Seoul (KR)

(72) Inventors: Ji-Hye Yang, Daejeon (KR); Jang-Bae Kim, Daejeon (KR); Byoung-Bae Lee, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 14/591,135

(22) Filed: Jan. 7, 2015

(65) Prior Publication Data

US 2015/0125747 A1 May 7, 2015

Related U.S. Application Data

(63) Continuation of application No. PCT/KR2014/005376, filed on Jun. 18, 2014.

(30) Foreign Application Priority Data

Jun. 18, 2013 (KR) .................. 10-2013-0069920
Jun. 18, 2014 (KR) .................. 10-2014-0074405

(51) Int. Cl.
*H01M 4/139* (2010.01)
*H01M 4/62* (2006.01)
(Continued)

(52) U.S. Cl.
CPC ............ *H01M 4/622* (2013.01); *H01M 4/13* (2013.01); *H01M 4/133* (2013.01); *H01M 10/052* (2013.01); *Y02E 60/122* (2013.01)

(58) Field of Classification Search
CPC ...... H01M 4/13; H01M 4/622; H01M 4/133; H01M 10/052
USPC .................. 429/217; 252/182.1; 524/522
See application file for complete search history.

(56) References Cited

U.S. PATENT DOCUMENTS

2004/0121232 A1*  6/2004  Kato ............... H01M 4/136
                                                         429/217
2006/0246354 A1   11/2006  Lee et al.
(Continued)

FOREIGN PATENT DOCUMENTS

JP   WO 2012111425 A1 *  8/2012  ............ H01M 4/622
KR   2011-0060094 A       12/1996
(Continued)

OTHER PUBLICATIONS

International Search Report from PCT/KR2014/005376, dated Oct. 28, 2014.

*Primary Examiner* — Sean P Cullen
(74) *Attorney, Agent, or Firm* — Lerner, David, Littenberg, Krumholz & Mentlik, LLP

(57) ABSTRACT

The present disclosure relates to a binder solution for an anode, comprising a thermally cross-linkable polymer binder that is cross-linked by heat, and a solvent for dissolving the thermally cross-linkable polymer binder, and exhibiting a concentration of hydrogen ions corresponding to pH 2.5 to pH 4.5; an active material slurry for an anode, comprising the binder solution; an anode using the slurry; and an electrochemical device comprising the anode. The binder solution for an anode according to one aspect of the present disclosure can relieve the volume expansion of an anode active material by the intercalation and disintercalation of lithium during cycles of electrochemical devices to improve the durability of an anode active material layer, thereby enhancing the life characteristics of the electrochemical devices, and also can provide good dispersibility to the active material slurry for an anode, thereby improving the coating stability of an anode active material layer.

16 Claims, 4 Drawing Sheets

(51) Int. Cl.
*H01M 10/052* (2010.01)
*H01M 4/13* (2010.01)
*H01M 4/133* (2010.01)

(56) References Cited

U.S. PATENT DOCUMENTS

| | | | |
|---|---|---|---|
| 2009/0136845 A1* | 5/2009 | Choi | H01M 4/0404 |
| | | | 429/212 |
| 2010/0047659 A1 | 2/2010 | Miyama et al. | |
| 2011/0129759 A1 | 6/2011 | Hwang et al. | |
| 2012/0070737 A1* | 3/2012 | Son | C08F 8/14 |
| | | | 429/217 |
| 2012/0315541 A1* | 12/2012 | Sasaki | H01M 4/131 |
| | | | 429/211 |
| 2014/0054496 A1* | 2/2014 | Hanasaki | H01M 4/622 |
| | | | 252/182.1 |

FOREIGN PATENT DOCUMENTS

| | | |
|---|---|---|
| KR | 2002-0018393 A | 3/2002 |
| KR | 2004-0009328 A | 1/2004 |
| KR | 2006-0110235 A | 10/2006 |
| KR | 2009-0119895 A | 11/2009 |
| KR | 2012-0029899 A | 3/2012 |

* cited by examiner

BINDER SOLUTION FOR ANODE, ACTIVE MATERIAL SLURRY FOR ANODE COMPRISING THE BINDER SOLUTION, ANODE USING THE SLURRY AND ELECTROCHEMICAL DEVICE COMPRISING THE ANODE

CROSS-REFERENCE TO RELATED APPLICATION(S)

This application is a continuation of International Application No. PCT/KR2014/005376 filed on Jun. 18, 2014, which claims priority under 35 USC 119(a) to Korean Patent Application No. 10-2013-0069920 filed on Jun. 18, 2013 and Korean Patent Application No. 10-2014-0074405 filed on Jun. 18, 2014, in the Republic of Korea, which are incorporated herein by reference.

TECHNICAL FIELD

The present disclosure relates to a binder solution for an anode, more specifically a binder solution for an anode which can relieve the volume expansion of an anode active material by the intercalation and disintercalation of lithium to improve the durability of an anode and enhance the life characteristics of an electrochemical device; an active material slurry for an anode, comprising the binder solution; an anode using the slurry; and an electrochemical device comprising the anode.

BACKGROUND ART

Recently, there has been an increasing interest in energy storage technology. Electrochemical devices have been widely used as energy sources in the fields of cellular phones, camcorders, notebook computers, PCs and electric cars, resulting in intensive research and development into them.

In this regard, electrochemical devices are one of the subjects of great interest. Particularly, development of rechargeable secondary batteries has been the focus of attention. Recently, research and development of such batteries are focused on the designs of new electrodes and batteries to improve capacity density and specific energy.

Many secondary batteries are currently available. Among these, lithium secondary batteries developed in the early 1990's have drawn particular attention due to their advantages of higher operating voltages and much higher energy densities than conventional aqueous electrolyte-based batteries, for example, Ni-MH, Ni—Cd, and $H_2SO_4$—Pb batteries.

Such an electrochemical device generally comprises a cathode, an anode, and a separator interposed between the cathode and the anode. Each of the cathode and the anode comprises a current collector and an electrode active material layer formed by coating a slurry that contains an electrode active material, a polymer binder and a dispersing medium on the surface of the current collector, followed by drying.

Among electrode active materials, an anode active material may undergo volume expansion in the procedure that lithium is intercalated or disintercalated. In particular, a silicon oxide-based anode active material may result in more severe volume expansion.

Such a volume expansion of the anode active material may increase the size of pores formed on the surface of an anode active material layer, thereby generating cracks in an anode active material layer. From the generation of cracks, the anode active material may be released as cycles of electrochemical devices progress. From this, the charging and discharging characteristics and life characteristics of the electrochemical devices may be deteriorated.

DISCLOSURE

Technical Problem

Therefore, it is an object of the present disclosure to provide a binder solution for an anode, which can relieve the volume expansion of an anode active material by the intercalation and disintercalation of lithium during cycles of electrochemical devices to improve the durability of an anode active material layer, thereby enhancing the life characteristics of the electrochemical devices, and can provide good dispersibility to an active material slurry for an anode, thereby improving the coating stability of an anode active material layer; an active material slurry for an anode, comprising the binder solution; an anode using the slurry; and an electrochemical device comprising the anode.

Technical Solution

In order to achieve the object, in accordance with one aspect of the present disclosure, there is provided a binder solution for an anode, comprising a thermally cross-linkable polymer binder that is cross-linked by heat; and a solvent for dissolving the thermally cross-linkable polymer binder, and exhibiting a concentration of hydrogen ions corresponding to pH 2.5 to pH 4.5, preferably pH 3.0 to pH 3.5.

In the present disclosure, the thermally cross-linkable polymer binder may comprise a carboxyl group as a functional group.

The thermally cross-linkable polymer binder comprising a carboxyl functional group may be polyacrylic acid.

The solvent may be any one selected from the group consisting of acetone, tetrahydrofuran, methylene chloride, chloroform, dimethylform amide, N-methyl-2-pyrrolidone (NMP), cyclohexane, water and a mixture thereof.

Also, the binder solution for an anode may further comprise a water-based binder.

In the binder solution, the thermally cross-linkable polymer binder and the water-based binder may be present in a weight ratio of 2:8 to 5:5, preferably 2:8 to 4:6.

The water-based binder may be any one selected from the group consisting of styrene-butadiene rubber, carboxymethyl cellulose, polytetrafluoroethylene, polyethylene, polypropylene, ethylene/propylene copolymers, polybutadiene, butyl rubber, fluorine rubber, polyethylene oxide, polyvinylpyrrolidone, polyepichlorohydrin, polyphosphazene, polyacrylonitrile, polystyrene, ethylene/propylene/diene copolymers, polyvinylpyridine, chlorosulfonated polyethylene, latex, polyester resins, acrylic resins, phenolic resins, epoxy resins, polyvinyl alcohol, hydroxypropyl cellulose, and a mixture thereof.

In accordance with another aspect of the present disclosure, there is provided an active material slurry for an anode, comprising the above-mentioned binder solution for an anode, and an anode active material dispersed in the binder solution.

The active material slurry for an anode may exhibit a concentration of hydrogen ions corresponding to pH 2.5 to pH 4.5, preferably pH 3.0 to pH 3.5.

The active material slurry for an anode may contain solids in an amount of 43 to 50 wt % based on the total weight thereof.

Also, the anode active material may comprise metallic lithium, a carbon material, a metal compound, a metal oxide, or a mixture thereof.

The metal compound may be any one selected from the group consisting of Si, Ge, Sn, Pb, P, Sb, Bi, Al, Ga, In, Ti, Mn, Fe, Co, Ni, Cu, Zn, Ag, Mg, Sr, Ba, and a mixture thereof.

The metal oxide may be any one selected from the group consisting of silicon oxide, tin oxide, titanium oxide, lithium/vanadium-based oxide, and a mixture thereof.

In addition, in accordance with still another aspect of the present disclosure, there is provided an anode, comprising a current collector; and an anode active material layer formed by coating the above-mentioned slurry on one or both surface(s) of the current collector, followed by drying.

In the drying procedure, the solvent may be removed, and the thermally cross-linkable polymer binder may be cross-linked to itself to form a cross-linked polymer network.

The drying may comprise a first drying step conducted at a temperature of 120 to 140° C. so as to remove the solvent, and a second drying step conducted at a temperature of 140 to 160° C. under vacuum so as to form the cross-linked polymer network.

Further, in accordance with yet still another aspect of the present disclosure, there is provided an anode, comprising a current collector; and an anode active material layer formed on one or both surface(s) of the current collector, wherein the anode active material layer comprises an anode active material and a polymer binder, the polymer binder is a mixture of a thermally cross-linkable polymer binder and a water-based binder in a weight ratio of 2:8 to 5:5, and the thermally cross-linkable polymer binder is cross-linked to itself to form a cross-linked polymer network.

The thermally cross-linkable polymer binder may be polyacrylic acid, and the water-based binder may be styrene-butadiene rubber.

Furthermore, in accordance with yet still another aspect of the present disclosure, there is provided an electrochemical device, comprising a cathode, an anode, a separator interposed between the cathode and the anode, and a non-aqueous electrolyte solution, wherein the anode is the above-mentioned anode.

The electrochemical device may be a lithium secondary battery.

Advantageous Effects

The binder solution for an anode according to one aspect of the present disclosure can relieve the volume expansion of an anode active material by the intercalation and disintercalation of lithium during cycles of electrochemical devices to improve the durability of an anode active material layer, thereby enhancing the life characteristics of the electrochemical devices.

Also, the binder solution of the present disclosure can provide good dispersibility to an active material slurry for an anode, thereby improving the coating stability of an anode active material layer.

DESCRIPTION OF THE DRAWINGS

The accompanying drawings illustrate preferred embodiments of the present disclosure and, together with the foregoing disclosure, serve to provide further understanding of the technical spirit of the present invention. However, the present invention is not to be construed as being limited to the drawings.

BEST MODE

Figure 1:
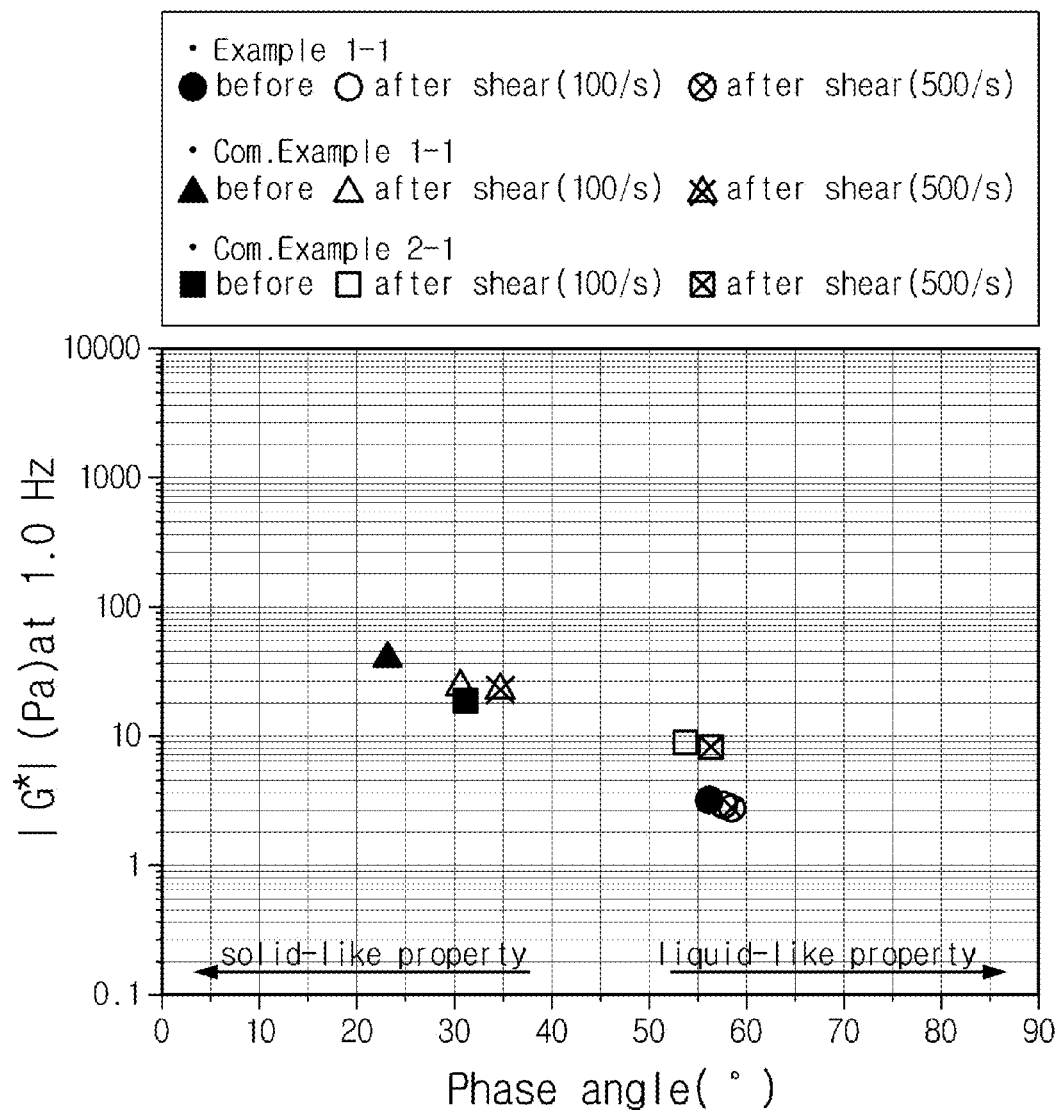
FIG. 1 is a graph showing the viscoelasticity of anode active material slurries obtained in the Examples and Comparative Examples of the present disclosure.

Hereinafter, the present invention will be described in detail. Prior to the description, it should be understood that the terms used in the specification and the appended claims should not be construed as limited to general and dictionary meanings, but interpreted based on the meanings and concepts corresponding to technical aspects of the present invention on the basis of the principle that the inventor is allowed to define terms appropriately for the best explanation.

The binder solution for an anode according to the present disclosure comprises a thermally cross-linkable polymer binder that is cross-linked by heat; and a solvent for dissolving the thermally cross-linkable polymer binder, and exhibits a concentration of hydrogen ions corresponding to pH 2.5 to pH 4.5, preferably pH 3.0 to pH 3.5.

Also, the active material slurry for an anode according to the present disclosure comprises the above-mentioned binder solution for an anode, and an anode active material dispersed in the binder solution. The active material slurry may exhibit a concentration of hydrogen ions corresponding to pH 2.5 to pH 4.5, preferably pH 3.0 to pH 3.5.

An anode active material which is used in the anode of an electrochemical device may undergo volume expansion in the procedure that lithium is intercalated or disintercalated. In particular, a silicon oxide-based anode active material may result in more severe volume expansion. Such a volume expansion of the anode active material may increase the size of pores formed on the surface of an anode active material layer, thereby generating cracks in an anode active material layer. From the generation of cracks, the anode active material may be released as cycles of electrochemical devices progress, thereby deteriorating conductivity between the active material and a current collector. From this, the charging and discharging characteristics and life characteristics of the electrochemical devices may be deteriorated.

In order to solve this problem, the thermally cross-linkable polymer that is cross-linked by heat is used as a binder in the preparation of an anode.

When the anode active material slurry comprising the thermally cross-linkable polymer binder is coated on at least one surface of a current collector, followed by drying, the thermally cross-linkable polymer binder may be cross-linked to itself to form a cross-linked polymer network, and the cross-linked polymer network can improve the durability of an active material layer to relieve the volume expansion of the anode active material according to the charging and discharging of an electrochemical device.

Also, when the binder solution and the active material slurry for an anode satisfy such concentration range of hydrogen ions, they exhibit a liquid behavior having a very high viscosity relative to elasticity, thereby allowing for the binder solution and the active material slurry to maintain good dispersibility, and eventually improving the coating stability of the anode active material layer.

The active material slurry for an anode may contain solids in an amount of 43 to 50 wt % based on the total weight thereof. When the solid content satisfies such range, the anode active material slurry can maintain a suitable viscosity to be uniformly coated on a current collector, and moisture to be necessarily dried is not excessive, so the time of drying can be suitably maintained to allow the economical process.

Meanwhile, the thermally cross-linkable polymer binder may comprise a carboxyl group as a functional group. The carboxyl group is cross-linked by heat to form carboxylic anhydride groups as well as hydrogen bonds between molecules, from which a linear polymer chain can partially be changed into a cross-linked polymer network, thereby relieving the volume expansion of the anode active material.

The thermally cross-linkable polymer binder comprising a carboxyl functional group may be polyacrylic acid.

The polyacrylic acid may have a weight-average molecular weight of 400,000 to 800,000.

Also, the binder solution for an anode may further comprise a water-based binder.

In the binder solution, the thermally cross-linkable polymer binder and the water-based binder may be present in a weight ratio of 2:8 to 5:5, preferably 2:8 to 4:6. If the weight ratio of the water-based binder exceeds the upper limit of such range, the mechanical property of the electrode active material layer may be improved, but the resistance thereof may increase. Also, if the weight ratio of the thermally cross-linkable polymer binder exceeds the upper limit of such range, the mechanical property of the electrode active material layer may decrease and the stability of the electrode active material slurry may be deteriorated. Therefore, when such weight ratio range is satisfied, the cross-linked polymer network can be formed in an appropriated amount, thereby relieving the volume expansion of the anode active material layer.

As used herein, the term "water-based binder" refers to a water-soluble or water-dispersible binder polymer, and it may be any one selected from the group consisting of styrene-butadiene rubber, carboxymethyl cellulose, polytetrafluoroethylene, polyethylene, polypropylene, ethylene/propylene copolymers, polybutadiene, butyl rubber, fluorine rubber, polyethylene oxide, polyvinylpyrrolidone, polyepichlorohydrin, polyphosphazene, polyacrylonitrile, polystyrene, ethylene/propylene/diene copolymers, polyvinylpyridine, chlorosulfonated polyethylene, latex, polyester resins, acrylic resins, phenolic resins, epoxy resins, polyvinyl alcohol, hydroxypropyl cellulose, and a mixture thereof.

Non-limiting examples of the anode active material may include any one which have been conventionally used in the anode of electrochemical devices, for example may include metallic lithium, a carbon material, a metal compound, a metal oxide, and a mixture thereof.

The carbon material may be materials capable of intercalating lithium, including carbon, petroleum coke, activated carbon, graphite and other carbon materials.

The metal compound may be any one selected from the group consisting of Si, Ge, Sn, Pb, P, Sb, Bi, Al, Ga, In, Ti, Mn, Fe, Co, Ni, Cu, Zn, Ag, Mg, Sr, Ba, and a mixture thereof.

The metal oxide may be any one selected from the group consisting of silicon oxide, tin oxide, titanium oxide, lithium/vanadium-based oxide, and a mixture thereof.

In the present disclosure, the solvent may be any one selected from the group consisting of acetone, tetrahydrofuran, methylene chloride, chloroform, dimethylformamide, N-methyl-2-pyrrolidone (NMP), cyclohexane, water and a mixture thereof, but is not limited thereto.

The solvent may be removed in the preparation of an electrochemical device since it may be remained in the finally prepared electrochemical device to cause various side reactions depending on the kinds thereof.

Also, in accordance with another aspect of the present disclosure, there is provided an anode, comprising a current collector; and an anode active material layer formed by coating the above-mentioned slurry on one or both surface(s) of the current collector, followed by drying.

Non-limiting examples of the current collector may include foils obtained from copper, gold, nickel, a copper-containing alloy, or a combination thereof.

In the drying procedure, the solvent may be removed, and the thermally cross-linkable polymer binder may be cross-linked to itself to form a cross-linked polymer network. The drying may comprise a first drying step conducted at a temperature of 120 to 140° C. so as to remove the solvent, and a second drying step conducted at a temperature of 140 to 160° C. under vacuum so as to form the cross-linked polymer network.

Further, in accordance with yet still another aspect of the present disclosure, there is provided an anode, comprising a current collector; and an anode active material layer formed on one or both surface(s) of the current collector, wherein the anode active material layer comprises an anode active material and a polymer binder, the polymer binder is a mixture of a thermally cross-linkable polymer binder and a water-based binder in a weight ratio of 2:8 to 5:5, and the thermally cross-linkable polymer binder is cross-linked to itself to form a cross-linked polymer network.

Regarding a weight ratio of the thermally cross-linkable polymer binder and the water-based binder, if the weight ratio of the water-based binder exceeds the upper limit of such range, the mechanical property of the electrode active material layer may be improved, but the resistance thereof may increase. Also, if the weight ratio of the thermally cross-linkable polymer binder exceeds the upper limit of such range, the mechanical property of the electrode active material layer may decrease and the stability of the electrode active material slurry may be deteriorated. Therefore, when such weight ratio range is satisfied, the cross-linked polymer network can be formed in an appropriated amount, thereby relieving the volume expansion of the anode active material layer.

The thermally cross-linkable polymer binder may be polyacrylic acid, and the a water-based binder may be styrene-butadiene rubber.

Further, in accordance with still another aspect of the present disclosure, there is provided an electrochemical device, comprising a cathode, an anode, a separator interposed between the cathode and the anode, and a non-aqueous electrolyte solution, wherein the anode is the above-mentioned anode.

The electrochemical device may be any device in which electrochemical reactions may occur, and specific examples of the electrochemical devices include all kinds of primary batteries, secondary batteries, fuel cells, solar cells or capacitors such as a super capacitor. In particular, among the secondary batteries, lithium secondary batteries including a lithium metal secondary battery, a lithium ion secondary battery, a lithium polymer secondary battery or a lithium ion polymer secondary battery are preferred.

The electrochemical device of the present disclosure may be prepared by lamination (stacking), folding or stacking/folding of a separator and an electrode, as well as a conventional winding process.

Also, the electrochemical device of the present disclosure is not limited to its shape. For example, the shape of the electrochemical device may be cylindrical such as a can, prismatic, pouch, or coin.

Meanwhile, a cathode applied in the electrochemical device of the present disclosure is not particularly limited, and may be manufactured by binding a cathode active material to a current collector according to a conventional method known in the art.

As a cathode active material, those that are commonly used in cathodes of conventional electrochemical devices may be used. Non-limiting examples of the cathode active material may include a lithium-manganese oxide, a lithium-cobalt oxide, a lithium-nickel oxide, a lithium-iron oxide, and a combination thereof, i.e., a lithium-containing composite oxide. Also, non-limiting examples of the current collector for a cathode may include foils obtained from aluminum, nickel, or a combination thereof.

Also, a separator which may be used in the present disclosure includes any one which has been conventionally used in the art, for example, porous membranes or non-woven fabrics made of a polyolefin-based polymer, but is not limited thereto.

The polyolefin-based porous membranes may be obtained from a polymer selected from polyethylenes such as a high-density polyethylene, a linear low-density polyethylene, a low-density polyethylene and an ultra-high molecular weight polyethylene, polypropylene, polybutylene, polypentene, and a mixture thereof.

The non-woven fabric may be a polyolefin-based non-woven fabric, or a non-woven fabric made of a polymer selected from polyethylene terephthalate, polybutylene terephthalate, polyester, polyacetal, polyamide, polycarbonate, polyimide, polyether ether ketone, polyether sulfone, polyphenylene oxide, polyphenylene sulfide, polyethylene naphthalene and a mixture thereof. The non-woven fabric may be a spun-bond or melt-blown fabric consisting of a long fiber in structure.

The porous substrate has preferably a thickness of 5 to 50 µm, but is not particularly limited thereto. Also, the porous substrate has a pore size of 0.01 to 50 µm and a porosity of 10 to 95%, but is not particularly limited thereto.

Also, in order to improve the mechanical strength of the separator and the safety of the electrochemical device, a porous coating layer comprising inorganic particles and a polymer binder may further be formed on at least one surface of the porous substrate.

The inorganic particles are not particularly limited if they are electrochemically stable. That is, the inorganic particles which may be used in the present disclosure are not particularly limited unless an oxidation-reduction reaction occurs in an operating voltage range (for example, 0 to 5 V based on Li/Li$^+$) of an applied electrochemical device. Particularly, inorganic particles having a high dielectric constant can increase the dissociation rate of an electrolyte salt, such as a lithium salt, in a liquid electrolyte, thereby improving an ionic conductivity the electrolyte solution.

The polymer binder may be at least one selected from the group consisting of polyvinylidene fluoride-co-hexafluoropropylene (PVDF-HFP), polyvinylidene fluoride-co-chlorotrifluoroethylene, polyvinylidene fluoride-co-trichloroethylene, polymethylmethacrylate, polybutylacrylate, polyacrylonitrile, polyvinylpyrrolidone, polyvinylacetate, polyethylene-co-vinyl acetate, polyethylene, polyethylene oxide, polyarylate, cellulose acetate, cellulose acetate butyrate, cellulose acetate propionate, cyanoethylpullulan, cyanoethylpolyvinylalcohol, cyanoethylcellulose, cyanoethylsucrose, pullulan, carboxyl methyl cellulose, and a mixture thereof, but is not limited thereto.

In the porous coating layer, the polymer binder is coated on a part or the whole of the surface of the inorganic particles, and the inorganic particles are connected with or immobilized to each other by the polymer binder, from which interstitial volumes are preferably formed between the inorganic particles. That is, the inorganic particles are substantially present in contact with each other, and the interstitial volumes between the inorganic particles become the pores of the porous coating layer. It is preferable that the interstitial volumes present between the inorganic particles have a size equivalent to or less than an average diameter of the inorganic particles.

Meanwhile, the electrolyte solution used in the present disclosure comprises a lithium salt as an electrolyte salt. The lithium salt may be any one which is conventionally used in an electrolyte solution for a lithium secondary battery. For example, an anion of the lithium salt may be any one selected from the group consisting of $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$ and $(CF_3CF_2SO_2)_2N^-$.

The electrolyte solution used in the present disclosure comprises an organic solvent which is conventionally used in an electrolyte solution for a lithium secondary battery, for example, ethers, esters, amides, linear carbonates, cyclic carbonates, and a mixture thereof.

Among these, a linear carbonate, a cyclic carbonate, or a mixture thereof are representatively used.

The cyclic carbonate may be selected from the group consisting of ethylene carbonate (EC), propylene carbonate (PC), 1,2-butylene carbonate, 2,3-butylene carbonate, 1,2-pentylene carbonate, 2,3-pentylene carbonate, vinylene carbonate, vinyl ethylene carbonate, a halide thereof and a mixture thereof. Examples of the halide include fluoroethylene carbonate (FEC) and the like, but are not limited thereto.

The linear carbonate may be selected from the group consisting of dimethyl carbonate (DMC), diethyl carbonate (DEC), dipropyl carbonate, ethyl methyl carbonate (EMC), methyl propyl carbonate, ethyl propyl carbonate and a mixture thereof, but is not limited thereto.

In particular, among the above carbonate-based organic solvents, the cyclic carbonates such as ethylene carbonate and propylene carbonate have a high viscosity and a high dielectric constant to more easily dissociate a lithium salt in an electrolyte. Such a cyclic carbonate may be mixed with a linear carbonate with low viscosity and low dielectric constant such as dimethyl carbonate and diethyl carbonate in a suitable ratio to provide an electrolyte solution with a high electric conductivity.

Also, the ether which may be used as the organic solvent is any one selected from the group consisting of dimethyl ether, diethyl ether, dipropyl ether, methyl ethyl ether, methyl propyl ether, ethyl propyl ether and a mixture thereof, but is not limited thereto.

In addition, the ester which may be used as the organic solvent is any one selected from the group consisting of methyl acetate, ethyl acetate, propyl acetate, methyl propionate, ethyl propionate, γ-butyrolactone, γ-valerolactone, γ-caprolactone, σ-valerolactone, ε-caprolactone and a mixture thereof, but is not limited thereto.

The introduction of the non-aqueous electrolyte may be carried out in any suitable step during the manufacturing of the electrochemical device depending on the manufacturing processes and desired physical properties of a final product. Specifically, the electrolyte may be introduced before assembling a battery or in the final step of the assembling.

Hereinafter, the present disclosure will be described in detail through specific examples. However, the description proposed herein is just a preferable example for the purpose of illustrations only, not intended to limit the scope of the invention, so it should be understood that the examples are provided for a more definite explanation to an ordinary person skilled in the art.

Preparation of Active Material Slurry for Anode (1) Example 1-1

A mixture of KSC 1064 (SiO:C, Shin-Etsu Chemical Co., Ltd.) and MAG-V2 (a mixture of artificial graphite/natural graphite, Hitachi chemical Co., Ltd.) in a weight ratio of 1:2 as an anode active material, polyacrylic acid (Sigma Aldrich, $M_w$ (weight average molecular weight): 450,000) being a thermally cross-linkable polymer as a binder, styrene-butadiene rubber as a water-based binder, and a carbon nanotube as a conductive material were mixed with each other to obtain an active material slurry (pH 3.3) for an anode, in which water was used as a solvent for dissolving the binder, and the anode active material, the binder and the conductive material were mixed in a weight ratio of 90:7:3, and the content of the binder was controlled such that the styrene-butadiene rubber and the polyacrylic acid were present in a weight ratio of 7:3.

(2) Comparative Example 1-1

The procedures of Example 1-1 were repeated except that the concentration of hydrogen ions was controlled to be pH 7.3, to obtain an active material slurry for an anode.

(3) Comparative Example 2-1

The procedures of Example 1-1 were repeated except that carboxymethyl cellulose was used as a polymer binder, to obtain an active material slurry for an anode.

Evaluation of Anode Active Material Slurry for Viscosity and Viscoelasticity

The pouch-type full cells prepared above were measured for their capacity under continuous charging and discharging conditions.

FIG. 1 is a graph showing the viscoelasticity of anode active material slurries obtained in the Examples and Comparative Examples of the present disclosure.

Referring to FIG. 1, the slurry of Comparative Examples 1-1 and 2-1 exhibited a solid behavior having a strong elasticity relative to viscosity, whereas the slurry of Example 1-1 exhibited a liquid behavior having a very high viscosity relative to elasticity. From this, it was confirmed the slurry of Example 1-1 to have the best dispersibility.

Preparation of Half-Cell (1) Example 1-2

1) Preparation of Anode

The anode active material slurry prepared in Example 1-1 was coated on a Cu foil current collector by a conventional method to obtain an anode.

2) Preparation of Half-Cell

A porous polyethylene membrane was interposed between the anode prepared above and metallic lithium to obtain an electrode assembly and a coin-type half-cell using the assembly.

(2) Comparative Example 1-2

The procedures of Example 1-2 were repeated except that the anode active material slurry prepared in Comparative Example 1-1 was used, to obtain a coin-type half-cell.

(3) Comparative Example 2-2

The procedures of Example 1-2 were repeated except that the anode active material slurry prepared in Comparative Example 2-1 was used, to obtain a coin-type half-cell.

Evaluation of Half-Cell for Cycle Characteristics

The coin-type half-cells were measured for their capacity under continued charging and discharging conditions. Also, in order to confirm the degradation degree of anodes before and after cycling, the surface of each anode was observed through an SEM.

Figure 2:
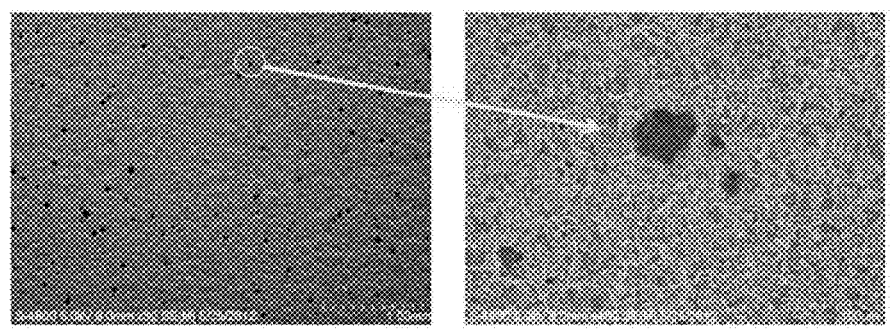
FIG. 2 is an SEM photograph showing the surface of an anode prepared in the Example of the present disclosure.
Figure 3:
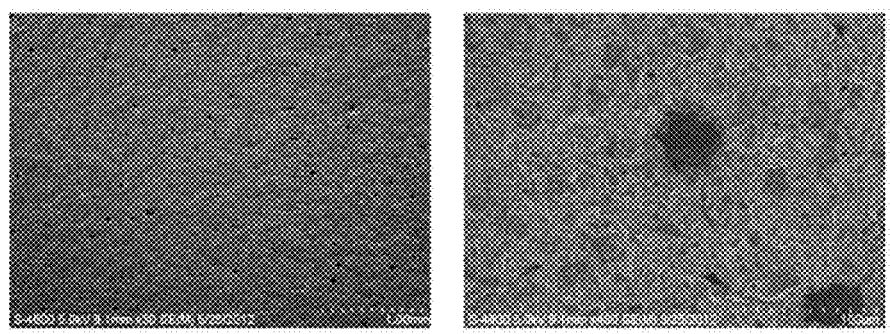
FIG. 3 is an SEM photograph showing the surface after 70 cycles of an anode prepared in the Example of the present disclosure.
Figure 4:
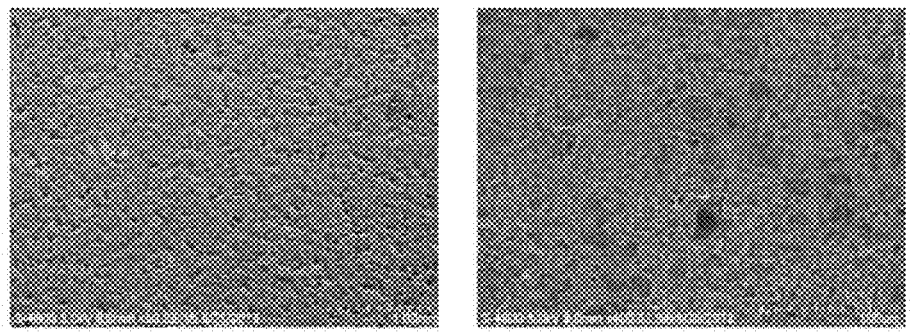
FIG. 4 is an SEM photograph showing the surface of an anode prepared in the Comparative Example of the present disclosure.
Figure 5:
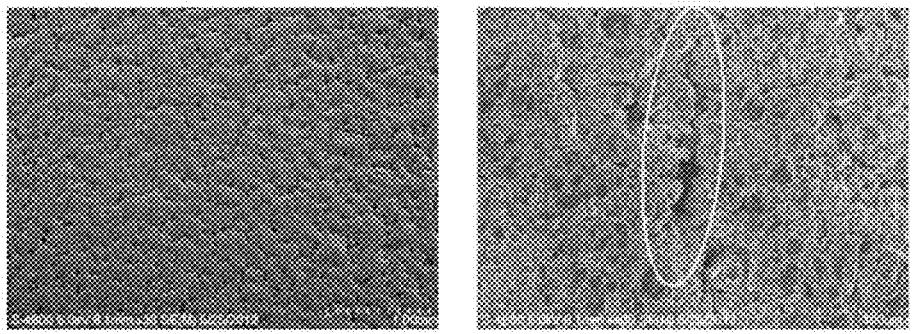
FIG. 5 is an SEM photograph showing the surface after 70 cycles of an anode prepared in the Comparative Example of the present disclosure.

FIGS. 2 and 3 are SEM photographs showing the initial surface and the surface after 70 cycles, respectively, of an anode prepared in Example 1-2. FIGS. 4 and 5 are SEM photographs showing the initial surface and the surface after 70 cycles, respectively, of an anode prepared in Comparative Example 2-2.

The cell of Comparative Example 2-2 was confirmed that its pores and small cracks were pre-formed before cycling and the length of the cracks became long during cycling, whereas the cell of Example 1-2 was confirmed that its pores or cracks pre-formed were smaller relative to Comparative Example 2-2, and the size change of the cracks is substantially less and the size of the pores became rather small during cycling.

That is, the cell of Comparative Example 2-2 was deemed to relieve stress in the direction that the size of cracks increases, the stress being applied due to the volume expansion of the anode active material during cycling. In contrast, the cell of Example 1-2 was deemed to relieve such a stress in the direction that the size of pores decreases.

Figure 6:
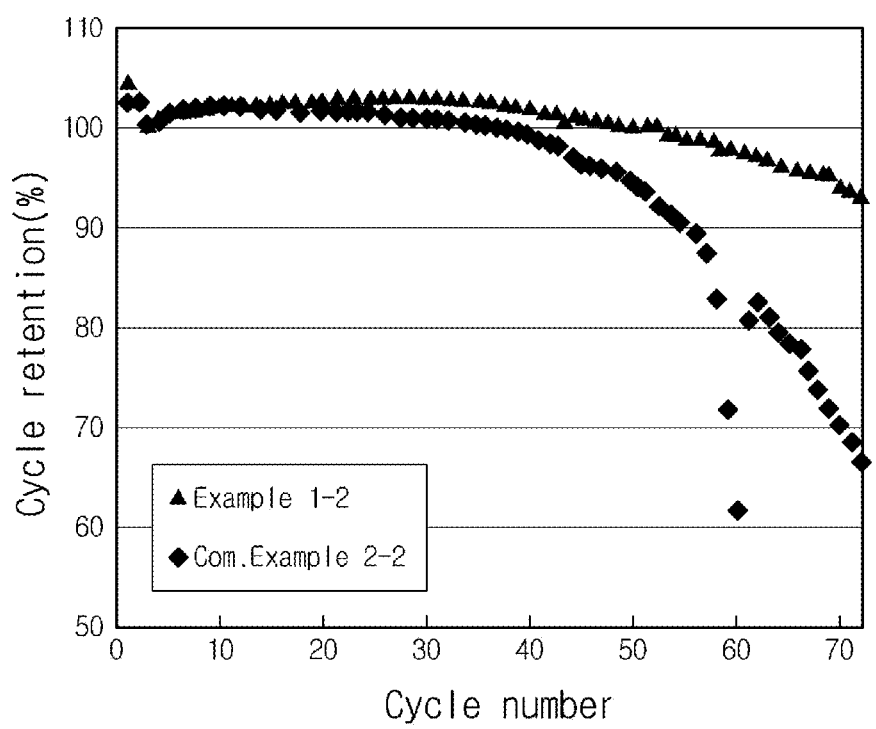
FIG. 6 is a graph showing the capacity retention (%) during 70 cycles of coin-type half-cells prepared in the Example and the Comparative Example of the present disclosure.

Meanwhile, FIG. 6 shows the capacity retention (%) during 70 cycles of coin-type half-cells prepared in Example 1-2 and Comparative Example 2-2. Referring to FIG. 6, after 70 cycles, the cell of the Example exhibited a capacity retention of 94.2%, whereas the cell of the Comparative Example exhibited a capacity retention of 70.2%, which is substantially poor as compared with that of the Example.

The foregoing disclosure is given by way of illustration only, and various changes and modifications within the spirit and scope of the disclosure will become apparent to those skilled in the art from this detailed description. Accordingly, it should be understood that the Examples of the present disclosure are provided for the purpose of illustrations only and to better explain to a person having ordinary skill in the art, and is not intended to limit the scope of the present disclosure. The scope of the present to be protected should be defined by the claims, all technical spirits equivalent thereto should be interpreted to be fallen within the scope of the present disclosure.

What is claimed is:

1. An anode, comprising:
a current collector; and
an anode active material layer formed on one or both surface(s) of the current collector,
wherein the anode active material layer comprises an anode active material and a polymer binder,
the polymer binder consists of a mixture of a thermally cross-linkable polymer binder and a water-based binder,
wherein the thermally cross-linkable polymer binder is polyacrylic acid,
the water-based binder is styrene-butadiene rubber,
a weight ratio of the thermally cross-linkable polymer binder to the water-based binder is 2:8 to 4:6, and
the thermally cross-linkable polymer binder is cross-linked to itself to form a cross-linked polymer network.

2. The anode of claim 1, wherein the anode active material comprises metallic lithium, a carbon material, a metal compound, a metal oxide, or a mixture thereof.

3. The anode of claim 2, wherein the metal compound is any one selected from the group consisting of Si, Ge, Sn, Pb, P, Sb, Bi, Al, Ga, In, Ti, Mn, Fe, Co, Ni, Cu, Zn, Ag, Mg, Sr, Ba, and a mixture thereof.

4. The anode of claim 2, wherein the metal oxide is any one selected from the group consisting of silicon oxide, tin oxide, titanium oxide, lithium/vanadium-based oxide, and a mixture thereof.

5. An electrochemical device, comprising a cathode, an anode, a separator interposed between the cathode and the anode, and a non-aqueous electrolyte solution, wherein the anode is defined in claim 1.

6. The electrochemical device of claim 5, which is a lithium secondary battery.

7. An anode, comprising:
a current collector; and
an anode active material layer formed by coating a anode active material slurry on one or both surface(s) of the current collector, followed by drying of the slurry;
wherein the anode active material slurry comprises:
an anode active material dispersed in a binder solution,
wherein the binder solution comprises:
a polymer binder consisting of:
a thermally cross-linkable polymer binder that is polyacrylic acid; and
a water-based binder that is styrene-butadiene rubber; and
a solvent for dissolving the thermally cross-linkable polymer binder,
wherein a weight ratio of the thermally cross-linkable polymer binder to the water based binder is 2:8 to 4:6, and
wherein the slurry has a pH ranging from 2.5 to 4.5,
wherein in the drying of the slurry, the solvent contained in the slurry is removed, and the thermally cross-linkable polymer binder contained in the slurry is cross-linked to itself to form a cross-linked polymer network.

8. The slurry of claim 7, wherein the slurry has a pH ranging from 3.0 to 3.5.

9. The anode of claim 7, wherein the solvent is any one selected from the group consisting of acetone, tetrahydrofuran, methylene chloride, chloroform, dimethylformamide, N-methyl-2-pyrrolidone (NMP), cyclohexane, water and a mixture thereof.

10. The anode of claim 7, whose solid content ranges from 43 to 50 wt % based on the total weight of the slurry.

11. The anode of claim 7,
wherein the drying comprises a first drying step conducted at a temperature of 120 to 140° C. so as to remove the solvent, and a second drying step conducted at a temperature of 140 to 160° C. under vacuum so as to form the cross-linked polymer network.

12. The anode of claim 7, wherein the anode active material comprises metallic lithium, a carbon material, a metal compound, a metal oxide, or a mixture thereof.

13. The anode of claim 12, wherein the metal compound is any one selected from the group consisting of Si, Ge, Sn, Pb, P, Sb, Bi, Al, Ga, In, Ti, Mn, Fe, Co, Ni, Cu, Zn, Ag, Mg, Sr, Ba, and a mixture thereof.

14. The anode of claim 12, wherein the metal oxide is any one selected from the group consisting of silicon oxide, tin oxide, titanium oxide, lithium/vanadium-based oxide, and a mixture thereof.

15. An electrochemical device, comprising a cathode, an anode, a separator interposed between the cathode and the anode, and a non-aqueous electrolyte solution, wherein the anode is defined in claim 7.

16. The electrochemical device of claim 15, which is a lithium secondary battery.

* * * * *